(12) United States Patent
Faber et al.

(10) Patent No.: US 10,591,033 B2
(45) Date of Patent: Mar. 17, 2020

(54) BALL SCREW NUT

(71) Applicant: Schaeffler Technologies AG & Co. KG, Herzogenaurach (DE)

(72) Inventors: Daniel Faber, Burgthann (DE); Benjamin Wubbolt-Gorbatenko, Herzogenaurach (DE); Matthias Dohr, Herzogenaurach (DE); Fritz Kammerer, Neuhof-Zenn (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 72 days.

(21) Appl. No.: 15/517,059

(22) PCT Filed: Oct. 5, 2015

(86) PCT No.: PCT/DE2015/200466
§ 371 (c)(1),
(2) Date: Apr. 5, 2017

(87) PCT Pub. No.: WO2016/058605
PCT Pub. Date: Apr. 21, 2016

(65) Prior Publication Data
US 2017/0299026 A1     Oct. 19, 2017

(30) Foreign Application Priority Data

Oct. 17, 2014   (DE) .................. 10 2014 221 135

(51) Int. Cl.
| | | |
|---|---|---|
| *F16H 25/22* | (2006.01) | |
| *B21H 3/08* | (2006.01) | |
| *B21D 22/00* | (2006.01) | |

(52) U.S. Cl.
CPC ......... *F16H 25/2223* (2013.01); *B21D 22/00* (2013.01); *B21H 3/08* (2013.01); *F16H 25/2214* (2013.01)

(58) Field of Classification Search
CPC . F16H 25/2223; F16H 25/2214; B21D 22/00; B21D 22/025; B21D 22/105; B21D 22/125; B21H 3/08
USPC ............. 74/424.82, 424.87; 29/456, 465, 47, 29/890.053
See application file for complete search history.

(56) References Cited

U.S. PATENT DOCUMENTS

| | | | | |
|---|---|---|---|---|
| 2,581,482 A | * | 1/1952 | Hawkins ............. | F16H 25/2214 74/424.82 |
| 2,833,156 A | * | 5/1958 | Spontelli ............ | F16H 25/2223 74/424.84 |
| 2,855,792 A | * | 10/1958 | Gates .................. | F16H 25/2214 74/424.87 |

(Continued)

FOREIGN PATENT DOCUMENTS

| | | |
|---|---|---|
| CN | 1740590 A | 3/2006 |
| CN | 202851852 U | 4/2013 |

(Continued)

*Primary Examiner* — Bobby Rushing, Jr.
(74) *Attorney, Agent, or Firm* — Volpe and Koenig, P.C.

(57) ABSTRACT

A ball screw nut having a tubular sheet metal body with a thread profile and being optionally encapsulated in plastic. This sheet metal body is formed of a sheet metal part that includes the thread profile and a ball-returning piece inserted therein, which is designed as an additional sheet metal part.

11 Claims, 4 Drawing Sheets

(56) References Cited

U.S. PATENT DOCUMENTS

| | | | | |
|---|---|---|---|---|
| 3,261,224 | A | * | 7/1966 | Anthony ............. F16H 25/2223 74/424.86 |
| 4,186,621 | A | | 2/1980 | Brusasco |
| 4,364,282 | A | | 12/1982 | Nilsson |
| 4,864,883 | A | * | 9/1989 | Mayfield ............. F16H 25/2219 74/424.87 |
| 6,736,235 | B2 | * | 5/2004 | Yoshida ............... B62D 5/0427 180/444 |
| 6,851,330 | B2 | * | 2/2005 | Buchanan, Jr. ........ B21D 53/24 29/898.06 |
| 7,228,751 | B2 | * | 6/2007 | Nagai ................. F16H 25/2204 74/424.75 |
| 7,441,289 | B2 | * | 10/2008 | Loewenthal ........... A61G 7/012 5/611 |
| 8,091,201 | B2 | * | 1/2012 | Johnson ................ B21D 5/015 219/105 |
| 8,220,353 | B2 | * | 7/2012 | Teramachi .......... F16H 25/2223 29/898.056 |
| 8,356,396 | B2 | * | 1/2013 | Johnson .................... B66F 3/10 269/55 |
| 8,684,438 | B2 | * | 4/2014 | Stanik .................... B62D 25/02 296/146.15 |
| 9,010,210 | B2 | * | 4/2015 | Chen .................. F16H 25/2223 74/424.83 |
| 9,377,092 | B2 | * | 6/2016 | Asakura ............. F16H 25/2219 |
| 2007/0137345 | A1 | * | 6/2007 | Hayashi .............. F16H 25/2214 74/424.81 |
| 2007/0209465 | A1 | * | 9/2007 | Shirai ...................... B23G 1/02 74/424.71 |
| 2008/0190230 | A1 | | 8/2008 | Liao et al. |
| 2009/0294203 | A1 | * | 12/2009 | Okada ................. B62D 5/0448 180/444 |
| 2010/0043582 | A1 | * | 2/2010 | Tateishi ................ B23B 27/065 74/424.81 |
| 2013/0023349 | A1 | * | 1/2013 | Zwahr .................... F01L 1/047 464/160 |
| 2013/0055839 | A1 | * | 3/2013 | Pan ..................... F16H 25/2219 74/424.87 |
| 2014/0326090 | A1 | | 11/2014 | Kisa et al. |

FOREIGN PATENT DOCUMENTS

| | | | |
|---|---|---|---|
| DE | 2829433 | 1/1979 | |
| DE | 3032955 | 3/1981 | |
| DE | 4131486 | 3/1993 | |
| DE | 10028968 | 12/2001 | |
| DE | 102004040362 | 2/2006 | |
| DE | 102011081966 | 3/2013 | |
| EP | 921050 A1 * | 6/1999 | ............... B62D 5/04 |
| EP | 2515000 A1 | 10/2012 | |
| JP | 2007024174 | 2/2007 | |
| JP | 2007255488 | 10/2007 | |
| JP | 2012077914 A | 4/2012 | |

* cited by examiner

BALL SCREW NUT

BACKGROUND

The invention relates to a ball screw nut that is provided for a ball screw drive and comprises a tubular sheet-metal part with a thread profile functioning as a load section for roller bodies.

As a ball screw drive, a rolling element, helical raceway drive is defined, which includes balls as the rolling elements. The rolling elements traverse a helical-shaped load section that is formed by profiled sections of nut and spindle of the ball screw drive. After completely traversing the load section, the balls are fed through a deflection section located in the nut back into the load section. Ball screw drives are distinguished by high efficiencies of typically greater than 80% and can convert both rotational motion into a translational motion and also a translational motion into a rotational motion. With regard to standardization, reference is made to DIN ISO 3408-1:2011-04 and also the older standard DIN 69 051 part 1.

A ball screw nut according to the prior art is known, for example, from DE 28 29 433 C2. This ball screw nut consists of an outer sleeve that can be made from plastic and an inner sleeve-like component. The sleeve-like component has a screw-shaped groove and is provided with a plurality of radial passage holes on which ball return elements are set. The sleeve-like component also has, on its outer side, a helical-shaped groove that has the same pitch as the groove on the inner side, so that the sleeve wall essentially has the same strength everywhere. The ball return element consists of a cylindrical projection and a curved plate that has a grooved surface that corresponds to the outer contour of the sleeve-like component.

Another ball screw nut is known from DE 30 32 955 C2. This ball screw nut is produced using a compression molding method and is comprised of two halves each of which are produced from a metal band. In one of the halves, a return recess is formed, that is, a deflection section that feeds the balls of the rolling-element, helical raceway drive back into the load section after exactly one revolution around the spindle.

Another ball screw drive that has a ball rolling spindle, and a spindle nut arranged on this spindle, that is, a ball screw nut, is known, for example, from DE 10 2004 040 362 A1. In this case, the ball rolling spindle and the spindle nut also define a ball channel for the endless circulating of the balls. The ball channel comprises a helical-shaped, wound load section and a load-free deflection section with ends contacting the load section. The deflection section here describes two legs arranged at angles to each other viewed in the axial direction. An angle that is measured on the spindle axis and reaches from one end up to the other end of the deflection section preferably equals 140 to 150 degrees according to DE 10 2004 040 362 A1.

From DE 10 2011 081 966 A1, a rolling-element helical raceway drive is known that comprises a thread part constructed as a composite part. Thread pitches are here produced from metal by shaping processes and encapsulated with tubular carrier parts made from plastic. The rolling-element helical-raceway drive should be suitable for use in an electromechanical braking force booster.

A thread nut of a maintenance-free thread drive with sliding surfaces is known, for example, from DE 100 28 968 A1. This thread nut is a sleeve-shaped sheet-metal part that is produced, for example, from steel, copper, brass, or aluminum. On the metallic material of the sleeve there is a sliding coating that can contain polytetrafluoroethylene.

SUMMARY

The invention is based on the object of refining a ball screw nut with respect to the stated prior art especially with regard to a favorable relationship between production cost, weight, and functionality, especially for applications with moderate forces.

This objective is achieved according to the invention by a ball screw nut also by a method for producing a ball screw nut with one or more features of the invention. Constructions and advantages of the invention explained below in connection with the production method apply analogously also to the device, that is, the ball screw nut, and vice versa.

The ball screw nut has a sheet-metal body that is comprised of a tubular sheet-metal part provided with a thread profile and a ball return piece that is inserted in this sheet-metal part and is formed as another sheet-metal part. The tubular sheet-metal part having the thread profile can either be produced directly as an individual sleeve or by dividing a longer, profiled tube. The profiling of the tube can either describe a single, continuous thread profile or can be formed only in some sections, wherein each section forms the thread profile of a subsequent sheet-metal body.

In both cases, the ball screw nut preferably has a thread profile, that is, a load section with only a single winding. In other words: Each ball guided in the load section by the ball screw nut and the associated spindle is fed back into the load section again by the ball return piece after one full revolution. The length of the deflection section corresponds preferably to the pitch height of the thread profile of the ball screw nut and also of the thread of the associated spindle. Thus, it is sufficient when the deflection section is closed only toward the outer side of the ball screw nut. The ball channel has an intersection-free construction. Of a total of 360° over which the load section and the deflection section extend together on the inner circumference of the ball screw nut, the deflection section preferably takes up no more than 60°, in particular, no more than 30°. Thus, the load section extends over at least ⅚ or over at least $^{11}/_{12}$ of the circumference of the ball screw nut. Through this significant utilization of the circumference of the ball screw nut for load transfer between the ball screw nut and the associated spindle by means of the balls used as rolling elements in the ball screw drive, there are practically no tilting moments in the ball screw drive.

The sheet-metal body can have multiple such ball guide channels that are arranged one behind the other in the axial direction and are each comprised of a load section and a ball return section connecting the ends of the load section.

The ball return piece can be inserted into a rectangular recess of the sheet-metal part having the thread profile. This recess is preferably generated only when the tubular sheet-metal part already has the profiled section in the form of a thread. In a way that is favorable in terms of production, the recess can be produced by internal stamping. The tubular sheet-metal part in which the recess is formed is, for example, a seamless tube or a seamless sleeve produced, in particular, by deep-drawing.

Embodiments can also be realized in which the tubular sheet-metal part is constructed as a tube with a weld seam. In this case, the weld seam is located in the area in which the ball return piece is inserted. Thus, in an embodiment such as this, the load section is free from any weld seam.

The ball return piece that is constructed just like the tube or the sleeve as a metal part, in particular, steel-sheet part, shaped without cutting, can be fixed in the recess, for example, by welding, in particular, laser welding, or by clinching. According to one advantageous construction, the components of the ball screw nut forming the sheet-metal body, that is, the tubular sheet-metal part, and the ball return piece inserted in this sheet-metal part are encapsulated with plastic. Alternatively, the encapsulation can be also produced from other materials, especially from materials such as metal foam, which has a lower density than the material, that is, sheet metal, of the sheet-metal body.

The plastic encapsulation representing a support structure can be produced economically in an injection molding method after which the ball return piece is inserted and fixed in the tubular, profiled sheet-metal part. Through the combination of the metallic and non-metallic materials of the ball screw nut, on one hand, this part is able to absorb high surface pressures that occur due to the rolling contact in the ball screw drive and, on the other hand, the mass and moment of inertia of the ball screw nut is kept low. The plastic-metal composite of the ball screw nut also has favorable properties with respect to vibration.

In typical applications, the ball screw nut is a rotating component of a ball screw drive, while the associated spindle can move only linearly. With the ball screw nut, ball screw drives can also be realized in which the spindle rotates and the ball screw nut is shifted linearly. In addition, the ball screw nut can be used as a component of a non-self-locking transmission that converts a linear motion, for example, of the spindle, into a rotational motion.

The ball screw nut can be used, for example, in a linear actuator, for example, in the form of a brake actuator, coupling actuator, or chassis actuator, in automotive engineering. The ball screw nut can also be used in linear drives within industrial systems, for example, in processing, handling, or packaging systems. A use of the ball screw nut in building services engineering and in household appliances is also possible. In all cases, the ball screw nut can be driven electrically, for example, directly or by means of a transmission, in particular, belt drive.

BRIEF DESCRIPTION OF THE DRAWINGS

An embodiment of the invention is explained in more detail below with reference to a drawing. Shown herein are.

DETAILED DESCRIPTION OF THE PREFERRED EMBODIMENTS

A ball screw nut marked overall with the reference symbol 1 is provided for use in a ball screw drive. For its basic function, refer to the prior art cited above. A spindle interacting with the ball screw nut 1 and rolling bodies, namely balls, which roll between the ball screw nut 1 and the spindle, are not shown in the figures.

Figure 7:
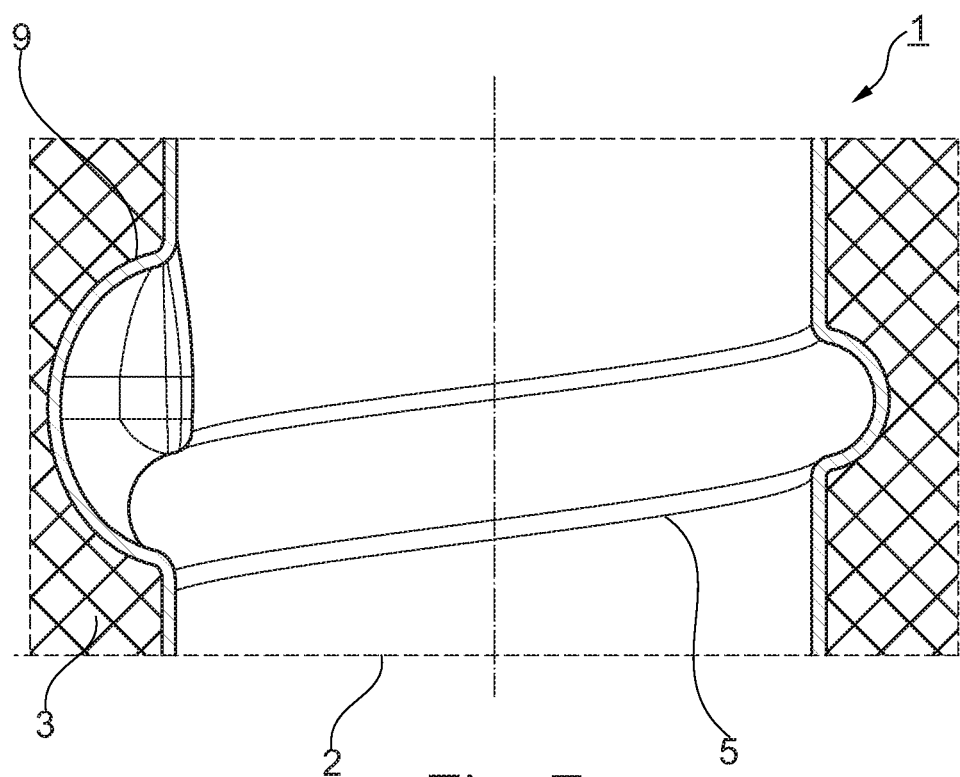

The ball screw nut 1 is formed as a composite part made from a sleeve-shaped sheet-metal body 2 and a plastic support structure 3 that surrounds the sheet-metal body 2 and is generated with an injection molding process. The complete ball screw nut 1, including the plastic support structure 3, is shown in FIG. 7. The support structure 3 is connected to the sheet-metal body 2 such that forces and torques can be transferred between the support structure 3 and the sheet-metal body 2. On the cylindrical outer circumference of the support structure 3 there can be a not-shown toothing arrangement that enables a drive of the ball screw nut 1 by a belt. The ball screw nut 1 can also be provided for driving by gearwheels or for direct, that is, gear-less, driving by an electromotor.

Figure 4:
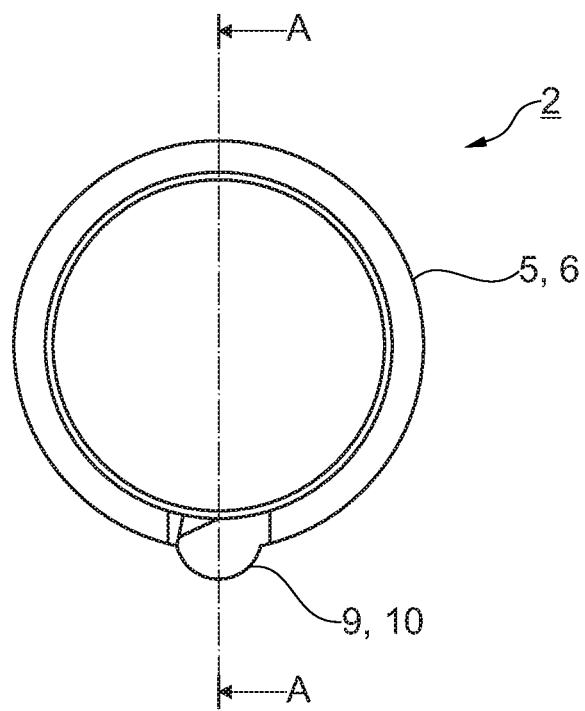
Figure 5:
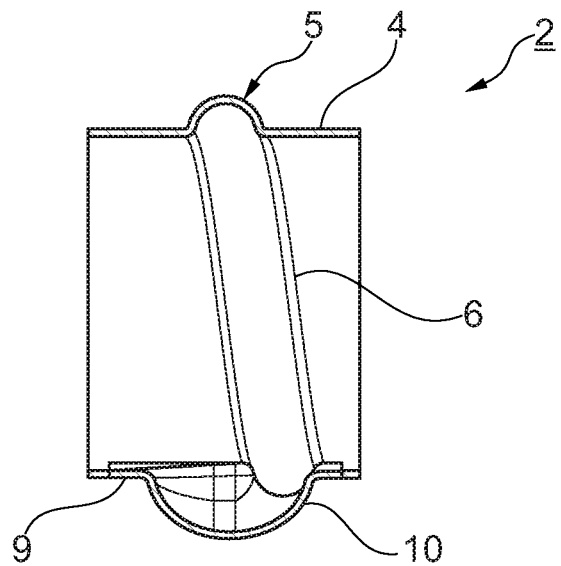
Figure 6:
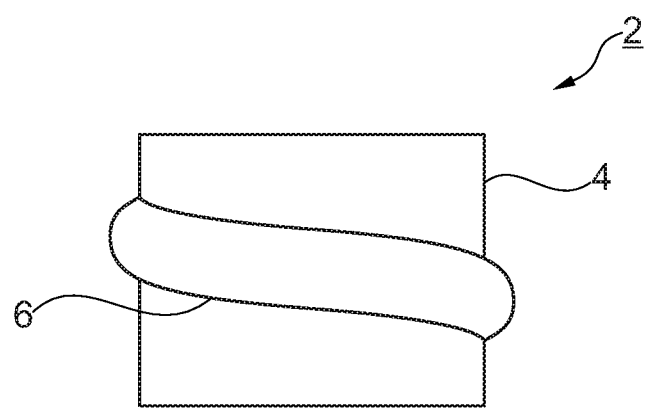

In FIGS. 1 to 6, only the sheet-metal body 2 of the ball screw nut 1 is shown, wherein FIG. 5 shows the section A-A (FIG. 4). Even with non-encapsulated sheet-metal bodies 2, together with balls as roller bodies and a spindle, a fully functional ball screw drive can be produced, especially for applications with low forces.

For the production of the sheet-metal body 2, the process starts with a smooth, cylindrical sleeve made from steel sheet. The sleeve is used in the illustrated embodiment for the production of a single sleeve-shaped sheet-metal part designated with 4. Alternatively, the process can start with a tube from which a plurality of sleeve-shaped sheet-metal parts 4 is produced. In both cases, the sleeve or the tube is profiled by non-cutting shaping processes such that a thread profile 5 is created that forms a raceway for the rolling bodies of the ball screw drive. The thread profile 5 can be shaped, in particular, by a roller tool.

Deviating from the construction shown in the figures, the thread profile 5 can reach up to the end sides of the essentially cylindrical sheet-metal part 4. This applies, in particular, for cases in which a plurality of sheet-metal parts 4 are produced by dividing a longer tube in which a continuous thread profile 5 is impressed.

The thread profile 5 provided in the sheet-metal part 4 for the rolling bodies of the ball screw drive extends once around the circumference of the sheet-metal part 4, that is, describes a single winding 6 that forms a load section of the ball screw drive. In the circumferential area where the beginning and end of the winding 6 lie, a recess 7 is formed in the sheet-metal part 4 by internal stamping. The recess 7 has an elongated, rectangular shape, wherein its narrow sides lie close to the end sides of the sheet-metal part 4. Between the recess 7 and the two end sides of the sheet-metal part 4 there are connecting pieces 8 that provide for sufficient stability of the sheet-metal part 4 during the production process.

Figure 1:
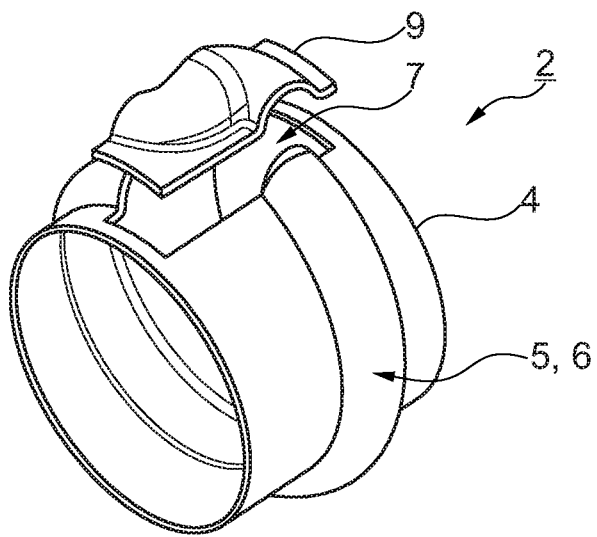
FIG. 1 a sheet-metal body of a ball screw nut in an exploded view.
Figure 2:
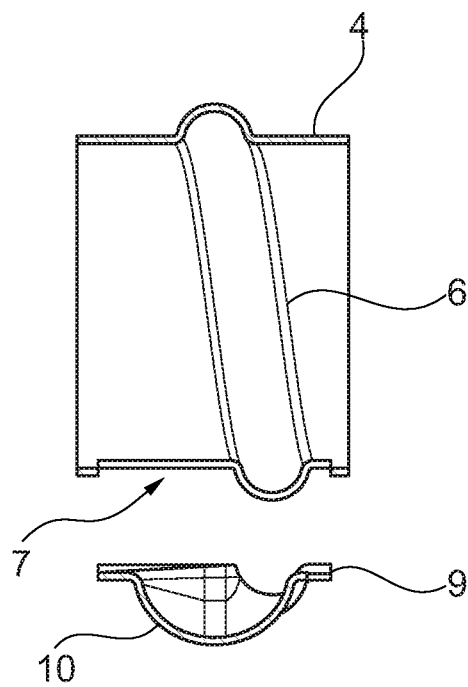
FIG. 2 the arrangement according to FIG. 1 in a section view.
Figure 3:
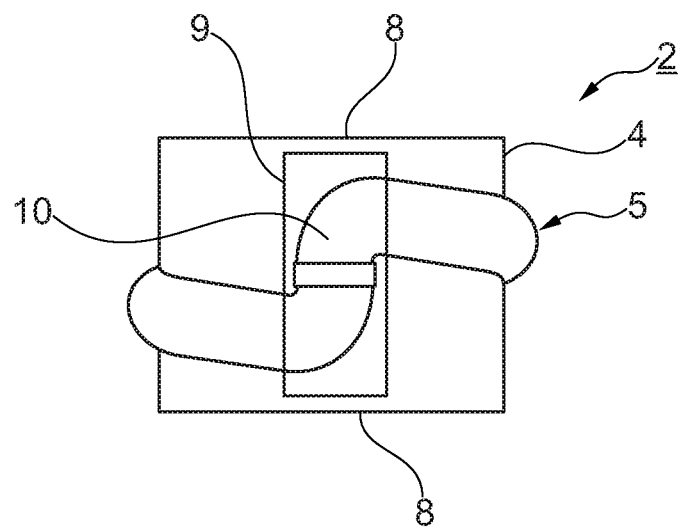
FIGS. 3 to 6 different views of the sheet-metal body of the ball screw nut, and FIG. 7 the ball screw nut including support structure made from plastic.

In the recess 7, a ball return piece 9 is inserted, which is shown raised from the sheet-metal part 4 in FIGS. 1 and 2. The ball return piece 9 is not the piece of sheet metal that was stamped out from the sheet-metal part 4 during the production of the recess 7. The thickness of the ball return piece 9 which is a steel sheet-metal part just like the sheet-metal part 4 is not necessarily identical to the thickness of the sleeve-shaped sheet-metal part 4. In particular, the ball return piece 9 that connects the start and end of the load section 6 and is exposed to less strong mechanical loads through the balls of the ball screw drive than the sheet-metal part 4 can have a smaller thickness than the sleeve-shaped sheet-metal part 4.

Towards the spindle of the ball screw drive, the ball return piece 9 is open. Through a slight pressure, the ball return piece 9 is fixed in the recess 7 of the sheet-metal part 4. Optionally, a more secure connection between the ball return piece 9 and the sheet-metal part 4 is produced by clinching or a spot-weld connection. Within the profiled section of the sheet-metal body 2 assembled from the sleeve-shaped sheet-metal part 4 and the ball return piece 9 in the ball screw nut 1, a deflection section designated with 10 is formed only by the ball return piece 9.

After the ball return piece 7 is mounted on the sheet-metal part 4, the sheet-metal body 2 completed in this way is encapsulated as a whole with the support structure 3 made from plastic so that the final ball screw nut 1, as shown in FIG. 7, is produced. The shrinkage of the plastic as it cools down creates, beyond the given positive-fit connection, a permanently tight connection between the support structure 3 and the sheet-metal body 2 of the ball screw nut 1. The support structure 3 contributes significantly to the stability of the entire ball screw nut 1.

LIST OF REFERENCE NUMBERS

1 Ball screw nut
2 Sheet-metal body
3 Support structure
4 Sheet-metal part
5 Thread profile
6 Winding, load section
7 Recess
8 Connecting piece
9 Ball return piece
10 Deflection section

The invention claimed is:

1. A method for producing a ball screw nut for a ball screw drive, the method comprising:
providing a tubular sheet-metal part having a thread profile, the thread profile consisting of a single winding;
generating a recess in the tubular sheet-metal part, the recess having an enclosed and elongated profile extending in an axial direction of the tubular sheet-metal part; and
inserting a ball return piece made from sheet metal into the recess such that the ball return piece is open toward a spindle of the ball screw drive.

2. The method according to claim 1, wherein the ball return piece is fixed in the tubular sheet-metal part having the thread profile by welding.

3. The method according to claim 1, wherein the ball return piece is fixed in the tubular sheet-metal part having the thread profile by clinching.

4. The method according to claim 1, further comprising encapsulating the tubular sheet-metal part with plastic after insertion of the ball return piece.

5. The method according to claim 1, wherein the tubular sheet-metal part is produced by cutting to length a tube profiled into a thread shape.

6. The method according to claim 1, wherein connecting pieces of the sheet-metal part are formed between the recess and two axial end sides of the sheet-metal part.

7. The method according to claim 1, wherein a thickness of the ball return piece is less than a thickness of the tubular sheet-metal part.

8. A ball screw nut for a ball screw drive produced according to the method of claim 1, wherein the thread profile forms a load section, and the ball return piece forms a deflection section.

9. The ball screw nut according to claim 8, wherein the recess has a rectangular profile extending in the axial direction of the tubular sheet-metal part.

10. The ball screw nut according to claim 8, wherein the tubular sheet-metal part having the thread profile is constructed as a continuously annular and circumferentially endless seamless tube.

11. The ball screw nut according to claim 8, further comprising a support structure made from plastic that surrounds the tubular sheet-metal part having the thread profile.

* * * * *